United States Patent
Baek et al.

(10) Patent No.: US 10,631,218 B2
(45) Date of Patent: Apr. 21, 2020

(54) APPARATUS AND METHOD FOR HANDOVER IN WIRELESS COMMUNICATION SYSTEM

(71) Applicants: Samsung Electronics Co., Ltd., Gyeonggi-do (KR); Korea University Research and Business Foundation, Seoul (KR)

(72) Inventors: Young Kyo Baek, Seoul (KR); Chung Gu Kang, Seoul (KR); Chan Seok Yang, Gyeonggi-do (KR); Jungje Son, Gyeonggi-do (KR); Sunghoon Kim, Seoul (KR); Jun Man Lee, Jeollabuk-do (KR); Hoyeon Lee, Seoul (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 15 days.

(21) Appl. No.: 16/024,163

(22) Filed: Jun. 29, 2018

(65) Prior Publication Data
US 2019/0007879 A1 Jan. 3, 2019

(30) Foreign Application Priority Data
Jun. 30, 2017 (KR) ........................ 10-2017-0083718

(51) Int. Cl.
*H04W 36/14* (2009.01)
*H04W 36/00* (2009.01)
*H04W 36/30* (2009.01)

(52) U.S. Cl.
CPC ....... *H04W 36/14* (2013.01); *H04W 36/0044* (2013.01); *H04W 36/0061* (2013.01);
(Continued)

(58) Field of Classification Search
CPC ......... H04W 36/0044; H04W 36/0061; H04W 36/0066; H04W 36/00835; H04W 36/14; H04W 36/30
See application file for complete search history.

(56) References Cited

U.S. PATENT DOCUMENTS

2004/0116120 A1* 6/2004 Gallagher ............. H04W 60/04
455/436
2004/0192211 A1* 9/2004 Gallagher ......... H04M 3/42246
455/67.11
(Continued)

OTHER PUBLICATIONS

Giuseppe Bianchi, "Performance Analysis of the IEEE 802.11 Distributed Coordination Function", IEEE Journal on Selected Areas in Communications, vol. 18, No. 3, Mar. 2000, pp. 535-547.
(Continued)

*Primary Examiner* — Stephen J Clawson
(74) *Attorney, Agent, or Firm* — The Farrell Law Firm, P.C.

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). a method for operating a terminal in a wireless communication system is provided. The method includes receiving information relating to a data session from a network node, determining a target node among nodes belonging to a second network based on the information relating to the data session, and performing a handover from a source node belonging to a first network to the target node.

13 Claims, 20 Drawing Sheets

(52) U.S. Cl.
CPC .. *H04W 36/0066* (2013.01); *H04W 36/00835* (2018.08); *H04W 36/30* (2013.01)

(56) References Cited

U.S. PATENT DOCUMENTS

| | | | | |
|---|---|---|---|---|
| 2006/0121935 | A1* | 6/2006 | Dalsgaard | H04W 36/0061 455/552.1 |
| 2007/0293222 | A1* | 12/2007 | Vikberg | H04W 16/32 455/436 |
| 2015/0117414 | A1* | 4/2015 | Tang | H04W 36/08 370/332 |
| 2017/0238252 | A1* | 8/2017 | Dalsgaard | H04W 76/15 370/311 |
| 2018/0007587 | A1* | 1/2018 | Feldman | H04L 65/1006 |

OTHER PUBLICATIONS

Wen-Hsin Yang, You-Chiun Wang, Yu-Chee Tseng and Bao-Shuh P. Lin, "Energy-efficient network selection with mobility pattern awareness in an integrated WiMAX and WiFi network" International Journal of Communication Systems, 23;213-230, Oct. 12, 2009.

LG Electronics, "TS 23.502: Handover procedure between 3GPP and non-3GPP", SA WG2 Meeting #120, S2-172526, Mar. 27-31, 2017, Busan South Korea, pp. 1-5.

Ericsson, "23.502: Handover between 3GPP and non-3GPP access", SA WG2 Meeting #120, S2-172525, Mar. 27-31, 2017, Busan Korea, pp. 1-8. 3GPP TS 23.502, V0.3.0 (Mar. 2017), 3rd Generation Partnership Project: Technical Specification Group Sevices and System Aspects; Procedures for the 5G System; Stage 2, Release 15, pp. 1-115, 2017.

3GPP TS 24.312, V14.1.0 (Jun. 2017), 3rd Generation Partnership Project: Technical Specification Group Core Network and Terminals; Access Network Discovery and Selection Function (ANDSF) Management Object (MO), Release 14, pp. 1-394, 2017.

3GPP TS 23.501, V0.4.0 (Apr. 2017), "3rd Generation Partnership Project: Technical Specification Group Services and System Aspects: System Architecture for the 5G System"; Stage 2, Release 15, pp. 1-124, 2017.

3GPP TR 23.799, V14.0.0 (Dec. 2016), "3rd Generation Partnership Project: Technical Specification Group Services and System Aspects; Study on Architecture for Next Generation System", Release 14, pp. 1-1522, 2016.

3GPP TR 23.402, V15.0.0 (Jun. 2017), "3rd Generation Partnership Project: Technical Specification Group Services and System Aspects: Architecture enchancements for non-3GPP accesses", Release 15, pp. 1-313, 2017.

3GPP TR 36.899-13, V13.0.0 (Jan. 2016), 3rd Generation Partnership Project: Technical Specification Group Radio Access Network: LTE Advanced inter-band Carrier Aggregation (CA) (3DL/3UL), Release 13, pp. 1-87, 2016.

3GPP TR 36.889, V13.0.0 (Jun. 2015), 3rd Generation Partnership Project: Technical Specification Group Radio Access Network; Study on Licensed-Assisted Access to Unlicensed Spectrum; Release 13, pp. 1-87, 2015.

3GPP TR 36.842, V12.0.0 (Dec. 2013), 3rd Generation Partnership Project: Technical Specification Group Radio Access Network: Study on Small Cell enchancements for E-UTRA and E-UTRAN; Higher Layer aspects, Release 12, pp. 1-14, 2013.

* cited by examiner

APPARATUS AND METHOD FOR HANDOVER IN WIRELESS COMMUNICATION SYSTEM

CROSS-REFERENCE TO RELATED APPLICATION(S)

This application is based on and claims priority under 35 U.S.C. § 119(a) to Korean Patent Application Serial No. 10-2017-0083718, which was filed on Jun. 30, 2017 in the Korean Intellectual Property Office, the entire disclosure of which is incorporated herein by reference.

BACKGROUND

1. Field

The disclosure relates, generally, to a wireless communication system, and more particularly, to an apparatus and method for a handover in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mm Wave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G communication system, when a network through a licensed band and a network through an unlicensed band coexist, a detailed process for performing, by a terminal, a handover from a source node belonging to the network through the licensed band to a target node belonging to the network through the unlicensed band has not yet been considered.

The above information is presented as background information only to assist with an understanding of the present disclosure. No determination has been made, and no assertion is made, as to whether any of the above might be applicable as prior art with regard to the present disclosure.

SUMMARY

The disclosure has been made to address at least the disadvantages described above and to provide at least the advantages described below. Accordingly, an aspect of the disclosure provides an apparatus and method for triggering a handover of a terminal by transmitting information relating to a data session in a wireless communication system.

An aspect of the disclosure provides an apparatus and method for determining a target node belonging to a second network on the basis of information relating to a data session in a wireless communication system.

An aspect of the disclosure provides an apparatus and method for transmitting information for instructing data session establishment in a wireless communication system.

An aspect of the disclosure provides an apparatus and method for transmitting a sequence number for data which has yet to be transmitted to a terminal in a wireless communication system.

In accordance with an aspect of the disclosure, there is provided a method for operating a terminal in a wireless communication system. The method includes receiving information relating to a data session from a network node, determining a target node among nodes belonging to a second network based on the information relating to the data session, and performing a handover from a source node belonging to a first network to the target node.

In accordance with an aspect of the disclosure, there is provided a method for operating a network node in a wireless communication system. The method includes transmitting information relating to a data session to a terminal and processing a handover from a source node belonging to a first network to a target node belonging to a second network in response to transmitting the information relating to a data session, wherein the information relating to the data session is used to determine the target node belonging to the second network.

In accordance with an aspect of the disclosure, there is provided a terminal in a wireless communication system. The terminal includes at least one transceiver and at least one processor operably coupled to the at least one transceiver and configured to receive information relating to a data session from a network node, determine a target node belonging to a second network based on the information relating to the data session, and perform a handover from a source node belonging to a first network to the target node belonging to the second network.

In accordance with an aspect of the disclosure, there is provided a network node in a wireless communication system. The network node includes at least one transceiver and at least one processor operably coupled to the at least one transceiver and configured to perform transmission of information relating to a data session to a terminal, and process a handover from a source node belonging to a first network to a target node belonging to a second network in response to the transmission, and the information relating to the data session is used to determine the target node belonging to the second network.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
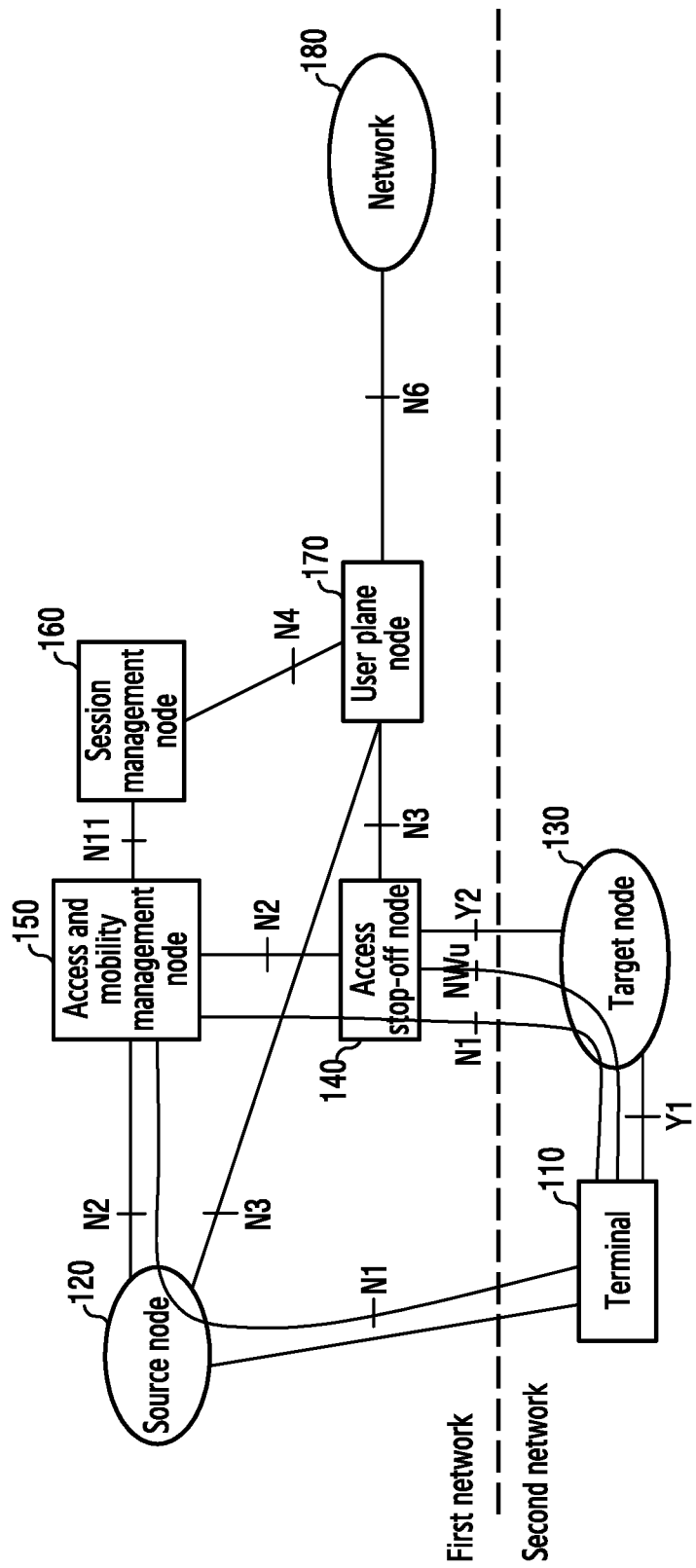
FIG. 1 is a diagram of a wireless communication system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

The embodiments described herein can be embodied using either hardware or software, or both.

Hereinafter, an electronic device will be described with reference to the accompanying drawings. In the disclosure, the term "user" may indicate a person using an electronic device or a device (e.g., an artificial intelligence electronic device) using an electronic device.

The disclosure relates to an apparatus and method for a handover in a wireless communication system. Specifically, in the disclosure, a technology for performing a handover based on information relating to a data session in a wireless communication system is described.

Further, in the disclosure, even though various embodiments are described using terms which have been used in certain telecommunications standards (e.g., The 3rd Generation Partnership Project (3GPP)), these terms are merely examples, and the embodiments of the disclosure may be modified and applied to other communication systems.

FIG. 1 is a diagram of a wireless communication system, according to an embodiment. FIG. 1 illustrates, in a wireless communication system, a terminal 110, a source node 120, a target node 130, an access stop-off node 140, an access and mobility management node 150, a session management node 160, a user plane node 170, and a network 180. Although FIG. 1 illustrates only one terminal 110, another terminal that is the same as or similar to the terminal 110 may be further included.

The terminal 110 is a device that can be used by a user and communicates with the source node 120 or the target node 130 through a wireless channel. In some cases, the terminal 110 may operate without involvement of the user. That is, the terminal 110 may be an apparatus configured to perform machine type communication (MTC) and may not be carried by the user. The terminal 110 may also be referred to as a terminal, user equipment (UE), a mobile station, a subscriber station, a remote terminal, a wireless terminal, a user device, or another term having a technical meaning equivalent thereto.

Each of the source node 120 and the target node 130 is a network infrastructure configured to provide a wireless access to the terminal 110. The source node 120 belongs to a first network and may communicate with the terminal 110 through a first radio access technology (RAT). The source node 120 may belong to a second network, and the target node 130 belongs to the second network and may communicate with the terminal 110 through a second RAT. The first network may include a network using a licensed band, and the first network may include a network using cellular communication. For example, the first network may include a network using long-term evolution (LTE) or 5G communication. The first network may be referred to, depending on a technical meaning thereof, as a 3GPP network or another name having a technical meaning equivalent thereto. The second network may include a network using an unlicensed band, and the second network may include a network using non-cellular communication. The second network may be trusted or untrusted. The second network, which when it is trusted, may include a second network having a high security level, and the second network, which when it is untrusted, may include a second network having a low security level. The second network may include a network using wireless fidelity (Wi-Fi). The second network may be referred to, depending on a technical meaning thereof, as a non-3GPP network or another name having a technical meaning equivalent thereto. The source node 120 and the target node 130 can have coverage defined in a predetermined geographical area based on a distance to which a signal can be transmitted. The source node 120 and the target node 130 may be referred to as a base station, an access point (AP), an eNodeB (eNB), a $5^{th}$ Generation (5G) node, a wireless point, a transmission/reception Point (TRP), or another term having a technical meaning equivalent thereto.

The access stop-off node 140 allows the terminal 110 to have access to a core network through the second network. The core network may include the access and mobility management node 150 and the user plane node 170. The access stop-off node 140 may belong to a public land mobile Network (PLMN), which can be the same as the source node 120. The access stop-off node 140 may be referred to as a non-3GPP interworking function (N3IWF) or another name having a technical meaning equivalent thereto.

The access and mobility management node 150 manages a network access and mobility of the terminal 110. When both the source node 120 and the target node 130 are connected to the access and mobility management node 150, the access and mobility management node 150 may manage a handover of the terminal 110 from the source node 120 to the target node 130. The access and mobility management node 150 may be referred to as an access and mobility management function (AMF) or another name having a technical meaning equivalent thereto.

The session management node 160 manages a data session between the terminal 110 and the source node 120 or the target node 130. The session management node 160 may select the user plane node 170 for a corresponding data session. The session management node 160 may be referred to as a session management function (SMF) or another name having a technical meaning equivalent thereto.

The user plane node 170 functions as an anchor of an internet protocol (IP). The user plane node 170 may be referred to as a user plane function (UPF) or another name having a technical meaning equivalent thereto.

The network 180 transfers data using a downlink to the user plane node 170. The network 180 receives data transmitted by the terminal 110 from the user plane node 170.

Although each of the terminal 110, the source node 120, the target node 130, the access stop-off node 140, the access and mobility management node 150, the session management node 160, the user plane node 170, and the network 180 as one node in FIG. 1, one or more nodes may be implemented as one node. In addition, the terminal 110, the source node 120, the target node 130, the access stop-off node 140, the access and mobility management node 150, the session management node 160, the user plane node 170, and the network 180 may be configured by hardware or software and, for example, may configure a network configured through software such as software defined networking (SDN).

Figure 2:
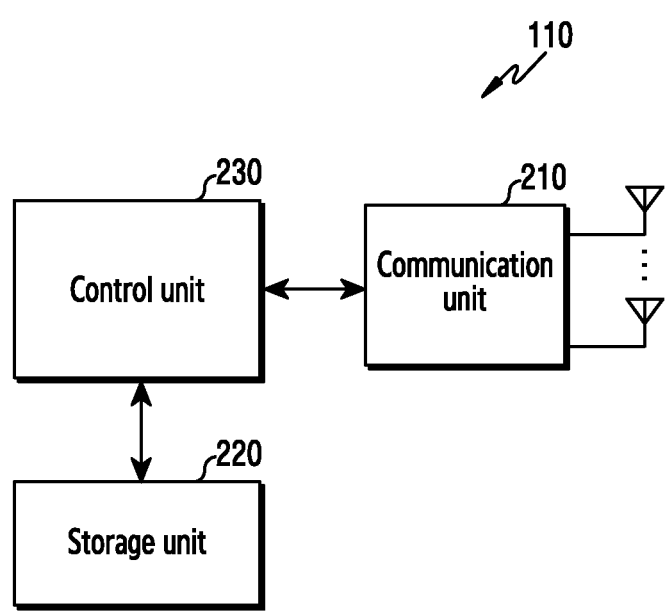
FIG. 2 is a diagram of a terminal in a wireless communication system, according to an embodiment.

FIG. 2 is a diagram of a terminal in a wireless communication system, according to an embodiment. The configuration of FIG. 2 may be used in the terminal 110.

Referring to FIG. 2, the terminal 110 includes a communication unit 210, a storage unit, and a control unit 230, and one or more antennas.

The communication unit 210 transmits and/or receives a signal through a wireless channel. The communication unit 210 converts between a baseband signal and a bitstream based on a physical layer standard of a system. When data is transmitted, the communication unit 210 generates complex-valued symbols by encoding and modulating a transmission bitstream. When data is received, the communication unit 210 restores a reception bitstream through decoding and demodulation of a baseband signal. The communication unit 210 up-converts a baseband signal into an RF band signal and then transmits the converted signal through an antenna, and down-converts an RF band signal received through the antenna into a baseband signal. The communication unit 210 may include a transmission filter, a reception filter, an amplifier, a mixer, an oscillator, a digital to analog converter (DAC), an analog to digital converter (ADC), etc.

The communication unit 210 may include multiple transmission/reception paths. The communication unit 210 may include at least one antenna array configured by multiple antenna elements. The communication unit 310 may be configured by a digital circuit and an analog circuit (e.g., a radio frequency integrated circuit (RFIC)). The digital circuit and the analog circuit may be implemented as a single package, a system on chip (SoC), an integrated circuit (IC), etc. The communication unit 210 may include multiple RF chains. In addition, the communication unit 210 may perform beamforming.

The communication unit 210 may include communication modules different from one another in order to process signals at frequency bands different from one another. The communication unit 210 may include multiple communication modules in order to support multiple wireless access technologies different from one another. The wireless access technologies may include bluetooth (BT) low energy (BLE), Wi-Fi, Wi-Fi Gigabyte (WiGig), a cellular network (e.g., 5G, new radio (NR), and LTE), etc. The frequency bands may include a super high frequency (SHF) band (e.g., 2.5 GHz and 5 GHz) and a millimeter Wave (mmWave) band (e.g., 60 GHz).

The communication unit 210 transmits and receives a signal as described above. Accordingly, all or a part of the communication unit 210 may be referred to as a transmitter, a receiver, or a transceiver.

The storage unit 220 stores data, such as a basic program, an application program, configuration information, etc., for operation of the terminal 110. The storage unit 220 may be configured by a volatile memory, a non-volatile memory, or a combination thereof. Further, the storage unit 220 provide data stored at a request of the control unit 230.

The control unit 230 controls general operations of the terminal 110. The control unit 230 transmits and receives a signal through the communication unit 210. The control unit 230 records data on the storage unit 220 and reads data from the storage unit 220. The control unit 230 may perform functions of a protocol stack required for a communication standard. The control unit 230 may include at least one processor or microprocessor or may be a part of a processor. The control unit 230 and a part of the communication unit 210 may be referred to as a communication processor (CP).

The control unit 230 may control the terminal 110 to perform a handover between networks that are different from each other. Specifically, the control unit 230 may determine whether there is a handover from the source node 120 belonging to the first network to a target node 130 belonging to the second network, select the target node 130 among nodes belonging to the second network on the basis of information relating to a data session, and control functions required for the handover to the target node 130. The control unit 230 may control the terminal 110 to perform the operations described in greater detail below.

Figure 3:
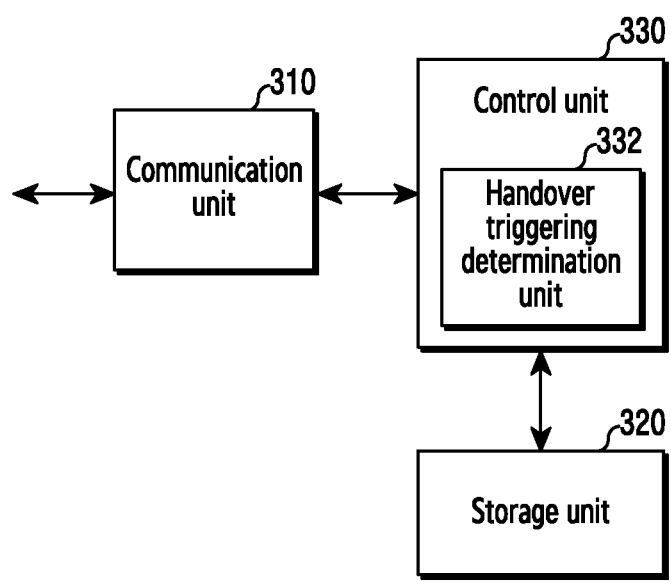
FIG. 3 is a diagram of an access and mobility management node in a wireless communication system, according to an embodiment.

FIG. 3 is a diagram of an access and mobility management node in a wireless communication system, according to an embodiment.

As illustrated in FIG. 3, the access and mobility management node includes a communication unit 310, a storage unit 320, and a control unit 330. The configuration shown in FIG. 3 may be used in the access and mobility management node 150.

The communication unit 310 provides an interface for communicating with other nodes in a network. The communication unit 310 converts a bitstream which is transmitted from the access and mobility management node to another node into a physical signal, and converts a physical signal received from another node into a bitstream. The communication unit 310 may transmit and receive a signal. Accordingly, the communication unit 310 may be referred to as a transmitter, a receiver, or a transceiver.

The storage unit 320 stores data, such as a basic program, an application program, configuration information, etc., for operation of an upper node. The storage unit 320 provides data stored at a request of the control unit 330.

The control unit 330 controls general operations of the upper node. The control unit 330 transmits or receives a signal through the communication unit 310. The control unit 330 records data on the storage unit 320 and reads data from the storage unit 320. The control unit 330 may include a handover triggering determination unit 332 that is configured to trigger a handover of the terminal 110 and trigger data session establishment of the terminal 110. The handover triggering determination unit 332 is an instruction set or code stored in the storage unit 320, and may be an instruction/code at least temporarily residing in the control unit 330, a storage space storing the instruction/code, or a part of circuitry configuring the control unit 330. The control unit 340 may control the access and mobility management node to perform operations described in greater detail below.

Figure 4:
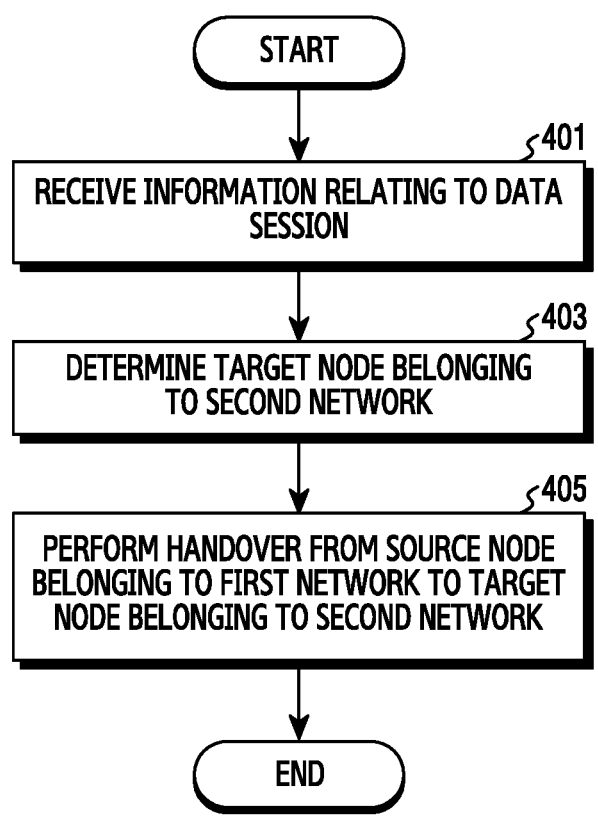
FIG. 4 is a flowchart of a method that can be used by a terminal in a wireless communication system, according to an embodiment.

FIG. 4 is a flowchart of a method used that can be used by the terminal 110 in a wireless communication system, according to an embodiment.

In step 401, the terminal 110 receives information relating to a data session from the access and mobility management node 150. Through a handover preparation procedure, the terminal 110 may receive information relating to a data session and including an identifier for the data session, wireless quality (e.g., quality of service (QoS)) relating to the data session, a target node list for the second network around the terminal 110, and a timer for triggering a handover.

In step 403, the terminal 110 determines a target node 130 belonging to the second network based on the information relating to the data session. Through a handover decision procedure, the terminal 110 may identify wireless quality relating to a data session on the basis of information relating to the data session and may determine a target node 130 belonging to the second network based on the wireless quality relating to the data session.

In step 405, the terminal 110 performs a handover from the source node 120 belonging to the first network to the target node 130 belonging to the second network. Through a handover execution procedure, the terminal 110 may receive, from the access and mobility management node 150, information for instructing data session establishment. Through a handover completion procedure, the terminal 110 may cease transmitting data to the source node 120 belonging to the first network. Information relating to a sequence number of data which has been already transmitted from the terminal 110 to the source node 120 belonging to the first network or has been already transmitted from the source node 120 belonging to the first network to the terminal 110 may be transmitted from the source node 120 belonging to the first network to the user plane node 170.

Figure 5:
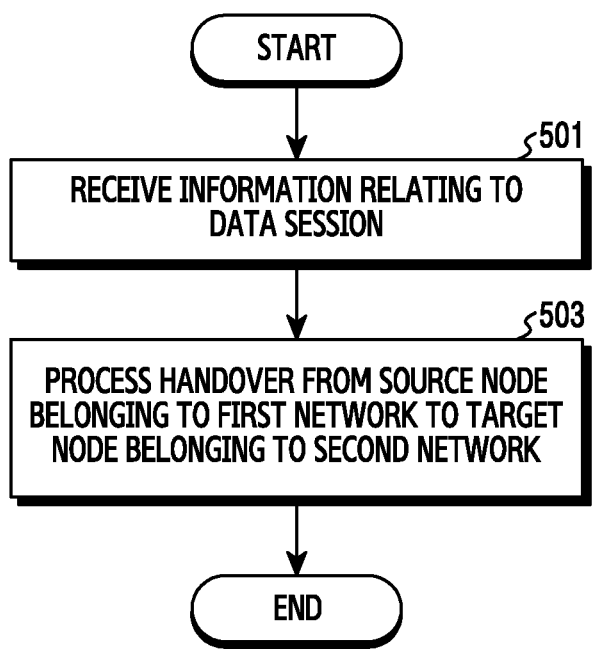
FIG. 5 is a flowchart of a method that can be used by an access and mobility management node in a wireless communication system, according to an embodiment.

FIG. 5 is a flowchart of a method that can be used by an access and mobility management node in a wireless communication system, according to an embodiment.

In step 501, the access and mobility management node 150 transmits information relating to a data session to the terminal 110. Through the handover preparation procedure, the access and mobility management node 150 may determine to trigger a handover of the terminal 110 based on at least one among a mobility pattern of the terminal 110, information relating to at least one target node around the terminal 110, information regarding a data session for the handover of the terminal 110, and a measurement value of the terminal 110 and may transmit the information relating to the data session.

In step 503, the access and mobility management node 150 may process a handover of the terminal 110 from the source node 120 belonging to the first network to the target node 130 belonging to the second network. Through the handover execution procedure, the access and mobility management node 150 may transmit to the terminal 110 information for instructing data session establishment.

Figure 6:
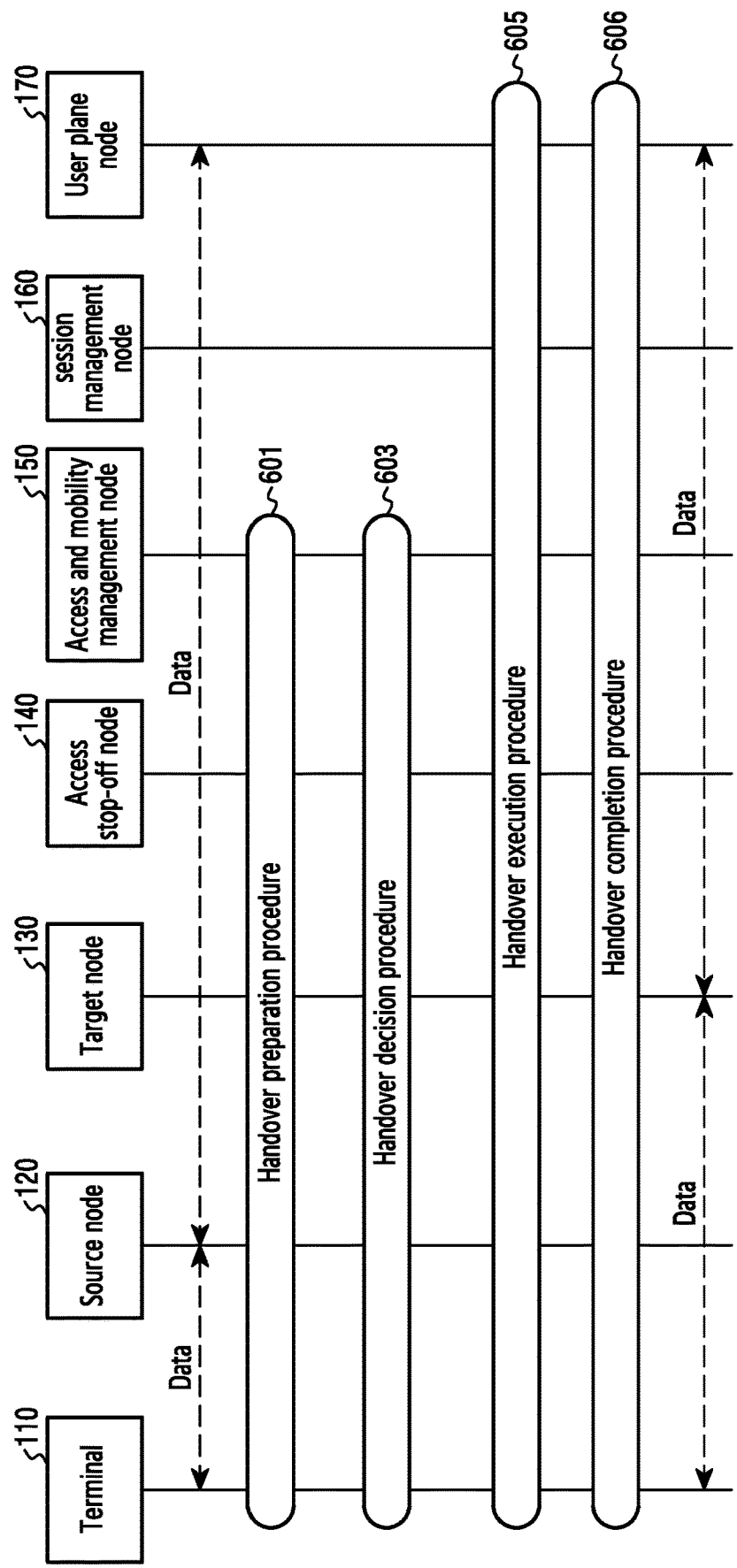
FIG. 6 is a diagram of a signal exchange for a handover in a wireless communication system, according to an embodiment.

FIG. 6 is a diagram of a signal exchange for a handover in a wireless communication system, according to an embodiment.

In step 601, the terminal 110 performs the handover preparation procedure together with other nodes included in a wireless communication system. The access and mobility management node 150 may determine to trigger a handover of the terminal 110. Subsequently, the access and mobility management node 150 may transmit a handover triggering request to the terminal 110. The handover preparation procedure may be performed under the lead of the access and mobility management node 150, regardless of the type of source node to which the terminal 110 has been connected and the target node to which the terminal 110 is to perform a handover. The handover preparation procedure may be performed under the lead of the access and mobility management node 150, regardless of whether the source node to which the terminal 110 has been connected at the moment and the target node to which the terminal 110 is to perform a handover belong to the first network or to the second network. Details of the handover preparation procedure of step 601 will be described in greater detail with respect to FIG. 7 below.

In step 603, the terminal 110 performs the handover decision procedure together with other nodes included in a wireless communication system. The terminal 110 may perform a procedure of searching for a target node 130 belonging to the second network. The terminal 110 may determine whether to perform a handover to the discovered target node 130 belonging to the second network. If the terminal 110 is not registered with the target node 130 belonging to the second network, the terminal 110 may additionally perform a target node registration procedure. The terminal 110 may transmit a handover triggering response, to the access and mobility management node 150. Details of the handover decision procedure of step 603 will be described in greater detail with respect to FIG. 8 below.

In step 605, the terminal 110 performs the handover execution procedure together with other nodes included in a wireless communication system. The terminal 110 may receive a request to instruct to trigger data session establishment from the access and mobility management node 150. The terminal 110 may transmit a request for the data session establishment to the access and mobility management node 150 in response to receiving of the request. The data session may be referred to as a protocol data unit (PDU) session. A PDU may signify a carrier (e.g., a packet frame) including control information and data. Details of the handover execution procedure of step 605 will be described in greater detail with respect to FIG. 9 below.

In step 607, the terminal 110 performs the handover completion procedure together with other nodes included in a wireless communication system. The terminal 110 may perform a procedure of data session establishment with a target node 130 belonging to the second network. The terminal 110 may receive information of accepting the data session establishment with the target node 130 belonging to the second network from the access and mobility management node 150. The terminal 110 may cease data transmission to the source node 120 belonging to the first network and may complete the data session establishment with the target node 130 belonging to the second network. The session management node 160 may transmit a data forwarding request to the user plane node 170. The data forwarding request may include a request to forward data which has yet to be transmitted to the terminal 110. The user plane node 170 may transmit to the source node 120 belonging to the first network an end marker to instruct to cease data transmission to the terminal 110. In response thereto, the source node 120 belonging to the first network may transmit a data forwarding response to the user plane node 170. The data forwarding response may include data which has yet to be transmitted to the terminal 110. The terminal 110 may receive data having yet to be received from the user plane node 170 and may complete a data session with the source node 120 belonging to the first network. Details of the handover completion procedure of step 607 will be described in greater detail with respect to FIG. 10 below.

Figure 7:
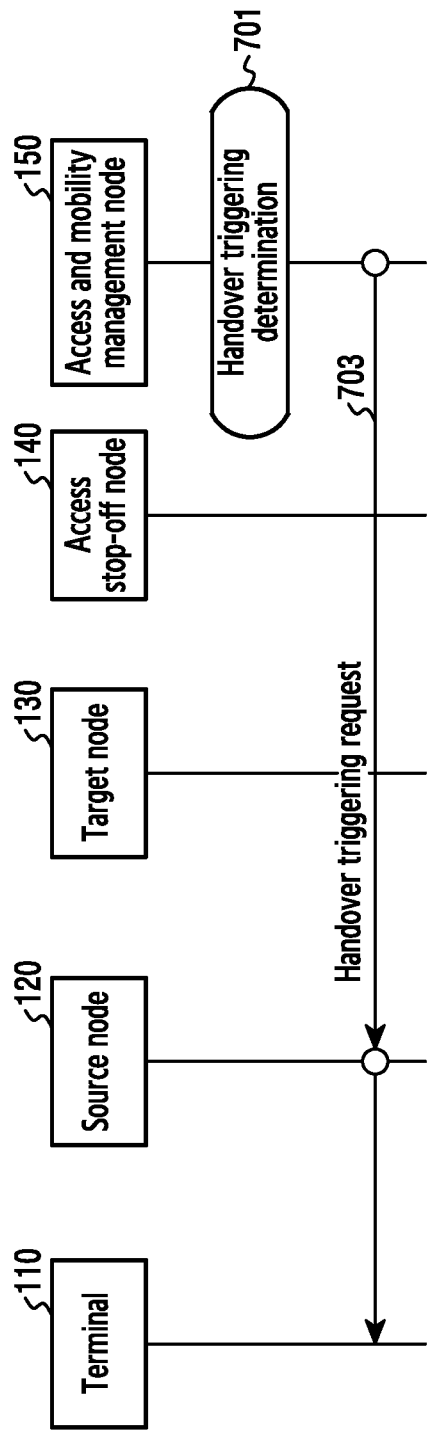
FIG. 7 is a diagram of a signal exchange for a handover preparation procedure in a wireless communication system, according to an embodiment.

FIG. 7 is a diagram of a signal exchange for a handover preparation procedure in a wireless communication system, according to an embodiment.

Referring to FIG. 7, in step 701, the access and mobility management node 150 determines to trigger a handover of the terminal 110. The access and mobility management node 150 may determine whether to trigger a handover of the terminal 110 based on at least one parameter in Table 1 described below.

When a parameter value for a mobility pattern of the terminal 110 is greater than a threshold value, the access and mobility management node 150 may determine to trigger a handover of the terminal 110. When an amount of traffic load of the target node 130 belonging to the second network is less or smaller than a threshold value, the access and mobility management node 150 may determine to trigger a handover of the terminal 110. When a parameter value for a QoS profile is greater than a threshold value, the access and mobility management node 150 may determine to trigger a handover of the terminal 110. The access and mobility management node 150 may determine to trigger a handover of the terminal 110 from a predetermined event or at a predetermined time. When the access and mobility management node 150 determines not to trigger any handover of the terminal 110, a connection to the source node 120 belonging to the first network may be maintained, and step 701 may be performed again after a predetermined time has elapsed. The access and mobility management node 150 may determine a handover policy for the terminal 110 by using a mobility pattern of the terminal 110 and information relating to the target node belonging to the second network around the terminal 110.

In step 703, the access and mobility management node 150 transmits a handover triggering request to the terminal 110. The handover triggering request may be transmitted to the terminal 110 through the source node 120 belonging to the first network. The handover triggering request may include at least partial information in Table 2 described below.

TABLE 1

| Information | Specific parameters of information | Obtain method |
| --- | --- | --- |
| Mobility pattern | Movement speed of the terminal 100<br>An amount of power remaining in the terminal 110<br>An amount of data consumption through a licensed band<br>A tracking area to which the terminal belongs | Obtainable periodically or by the access and mobility management node 150 triggering a mobility pattern update procedure of the terminal.<br>Obtainable by the terminal 110 updating a mobility pattern autonomously. |
| Target node belonging to second network around the terminal 110 | Whether there is, around the terminal 110, a target node belonging to the second network connected to the access and mobility management node 150 identical to that of the source node 120 belonging to the first network.<br>An amount of traffic load of the target node belonging to the second network connected to the access and mobility management node 150 identical to that of the source node 120 belonging to the first network.<br>Tracking Area List (TAL) Information relating to the second network assigned to the terminal 110 | Obtainable through an interface (e.g., N2) between the access and mobility management node 150 and the access stop-off node 140.<br>When the second network is an untrusted network, the access and mobility management node 150 may not obtain information relating to the target node belonging to the second network.<br>Before handover triggering, admission control may be performed by identifying an amount of traffic load of the target node belonging to the second network. For example, when traffic load of target nodes belonging to all the second networks around the terminal 110 is greater than a threshold value, the handover triggering may not performed.<br>The access and mobility management node 150 may assign a TAL relating to the second network to the terminal 110.<br>The access and mobility management node 150 may provide the terminal 110 with a handover policy by a unit of TAL relating to the second network assigned to the terminal 110.<br>That is, whenever the TAL relating to the second network assigned to the terminal 110 is changed, the access and mobility management node 150 may provide a handover policy updated through a handover triggering request. Handover performance differs depending on what TAL is assigned to the terminal 110 and what handover policy is provided in response to the assigned TAL. |
| Information relating to PDU session for performing handover | QoS profile (Guaranteed Bit Rate (GBR)/non-GBR) | Obtainable through an interface (e.g., N11) between the access and mobility management node 150 and the session management node 160 |
| Measurement information relating to terminal 110 | A measurement event due to a signal strength<br>An amount of traffic load of the source node 120 belonging to the first network | Obtainable from the terminal 110 when a predetermined event occurs while the terminal 110 periodically measures a signal strength of a neighbouring cell. |

TABLE 2

| Information | Required or optional | Use | Note |
| --- | --- | --- | --- |
| Identifier for PDU session | Required | The terminal 110 may provide an identifier for a PDU session in order for the terminal 110 to perform a handover. | When the identifier for the PDU session is not transmitted, a handover may be performed for all PDU sessions. |

TABLE 2-continued

| Information | Required or optional | Use | Note |
|---|---|---|---|
| QoS profile for each PDU Session | Required | The terminal 110 may provide essential information for determination of a handover. | The access and mobility management node 150 may transmit, to the terminal 110, a QoS profile for each PDU session received from the session management node 160. |
| Target node list for second network | Optional | An amount of traffic load of searching for a target node belonging to the second network around the terminal 110 may be reduced. Admission control for the target node belonging to the second network may be performed. | The target node list may include a handover priority order for target nodes belonging to the second network in the target node list. Target nodes belonging to the second network in the target node list may be connected to the access and mobility management node 150 identical to that of the source node 120 belonging to the first network. The target node list may be determined on the basis of a mobility pattern of the terminal 110, a target node belonging to the second network around the terminal 110, information relating to a PDU session for performing a handover, and measurement information relating to the terminal 110. The access and mobility management node 150 may instruct the terminal 110 to select only a target node belonging to the second network in the target node list, and may perform the admission control. |
| Timer for handover triggering | Optional | The terminal 110 may be informed of a time during which information included in a handover triggering request is effective. | The timer for handover triggering may be used to limit a time elapsing from the handover triggering until determination of a handover of the terminal 110. |

The access and mobility management node 150 provides the terminal 110 with a handover policy determined by using a mobility pattern of the terminal 110 and information relating to the target node belonging to the second network around the terminal 110, thereby guaranteeing a data session QoS budget and minimizing performance degradation due to a handover. The handover policy may include a target node list for the second network.

Figure 8:
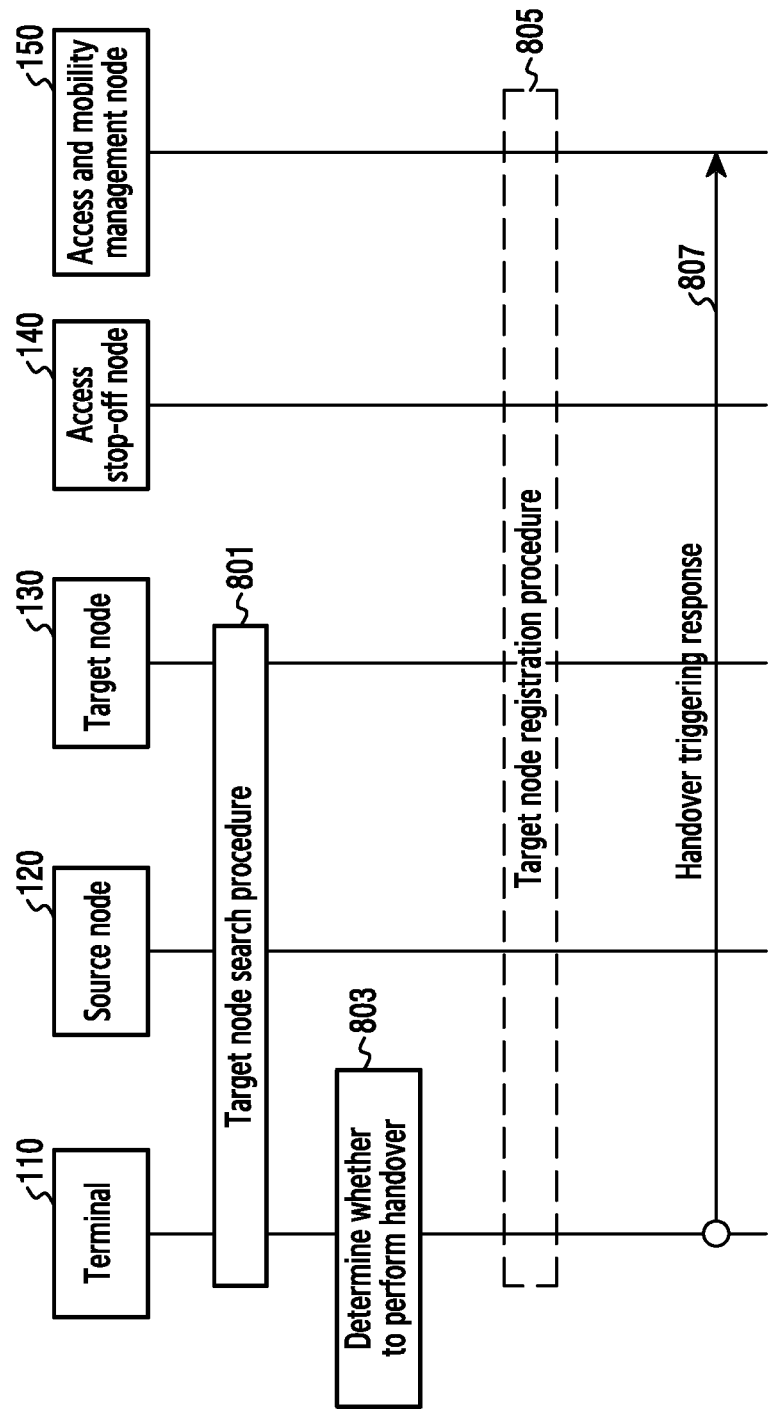
FIG. 8 is a diagram of a signal exchange for a handover decision procedure in a wireless communication system, according to an embodiment.

FIG. 8 is a diagram of a signal exchange for a handover decision procedure in a wireless communication system, according to an embodiment.

In step 801, the terminal 110 performs a procedure of searching for a target node 130 belonging to the second network. When the terminal 110 receives a target node list for the second network from the access and mobility management node 150, the terminal 110 may search for the target node 130 belonging to the second network by using the target node list for the second network. A target node list for the second network is provided, thereby allowing reduction of a time that the terminal 110 spends to search for the target node 130 belonging to the second network, and allowing reduction of power consumption of the terminal 110. The access and mobility management node 150 provides the target node list for the second network, and an optimal handover policy may thus be transferred to the terminal 110. When the terminal 110 does not receive a target node list for the second network from the access and mobility management node 150, the terminal 110 may search for all target nodes belonging to the second network therearound. The terminal 110 may determine whether there is the access stop-off node 140 and determine whether the source node 120 belonging to the first network and the access stop-off node 140 use the same access and mobility management node 150 or PLMN.

In step 803, the terminal 110 determines whether to perform a handover to the discovered target node 130 belonging to the second network. The terminal 110 may determine whether to perform a handover for each of the PDU session identifiers through the target node 130 belonging to the second network. The terminal 110 may identify wireless quality relating to the target node 130 belonging to the second network to determine whether QoS relating to the PDU session for performing a handover satisfies a predetermined criterion. Wireless quality relating to the target node 130 belonging to the second network may include a wireless channel access delay time, a signal strength, and a signal to interference plus noise ratio (SINR). The terminal 110 may determine whether to perform a handover to the target node 130 belonging to the second network based on the information included in a handover triggering request and the wireless quality relating to the target node belonging to the second network. The terminal 110 may display a user interface (UI) for finally inquiring of a user whether to perform a handover to the target node 130 belonging to the second network. The terminal 110 may determine to perform the handover to the target node 130 belonging to the second network only when a user input permitting the handover to the target node 130 belonging to the second network has been received.

In step 805, when the terminal 110 is not registered with the target node 130 belonging to the second network, the terminal 110 may additionally perform a target node registration procedure. The terminal 110 may be registered with the target node 130 belonging to the second network, by transmitting a target node registration request to the access and mobility management node 150 through the access stop-off node 140. When the terminal 110 is registered with the target node 130 belonging to the second network, step 805 may be omitted.

In step 807, the terminal 110 transmits a handover triggering response to the access and mobility management node 150. The handover triggering response may be transmitted to the access and mobility management node 150 through the source node 120 belonging to the first network. The handover triggering response may include an identifier of a PDU session. When the terminal 110 has determined not to perform a handover to the target node 130 belonging to the second network in step 803, the handover triggering response may include a negative acknowledgement (NACK) relating to the handover. The access and mobility management node 150, which has received the handover triggering response including the NACK relating to the handover, may perform step 701 of FIG. 7 again.

Figure 9:
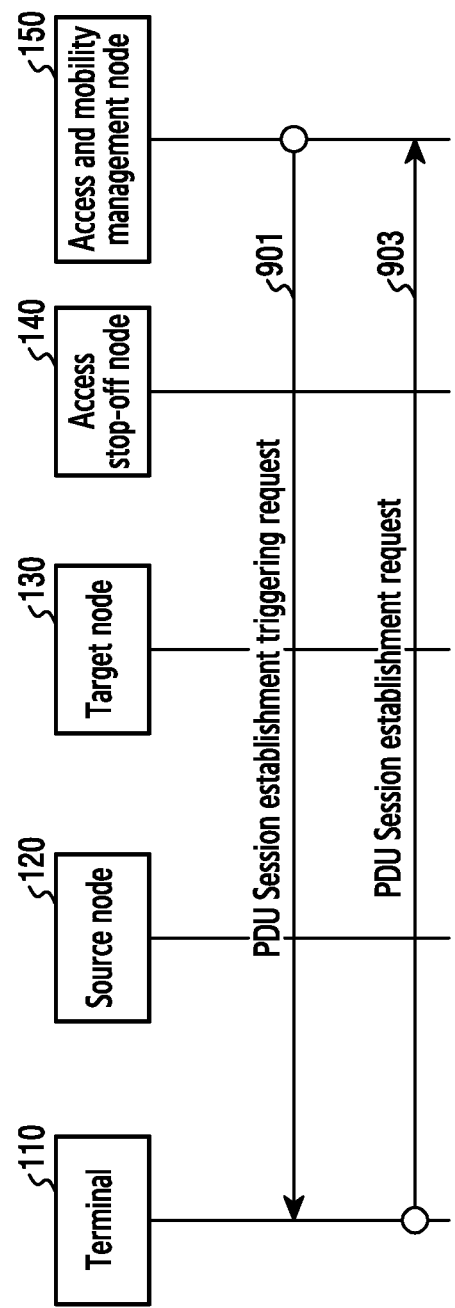
FIG. 9 is a diagram of a signal exchange for a handover execution procedure in a wireless communication system, according to an embodiment.

FIG. 9 is a diagram of a signal exchange for a handover execution procedure in a wireless communication system, according to an embodiment.

In step 901, the terminal 110 receives from the access and mobility management node 150 a request for instructing to trigger PDU session establishment. The terminal 110 may perform a PDU session establishment procedure only after receiving the request for instructing to trigger PDU session establishment.

In step 903, the terminal 110 transmits a request for PDU session establishment to the access and mobility management node 150 in response to receiving of the request. The terminal 110 can inform the access and mobility management node 150 of handover performance by configuring the type of a request for PDU session establishment as "PDU session already exists". Transmitting a request for establishing a PDU session, even though a PDU session already exists, signifies performing a handover from the existing PDU session to the other PDU session.

Figure 10:
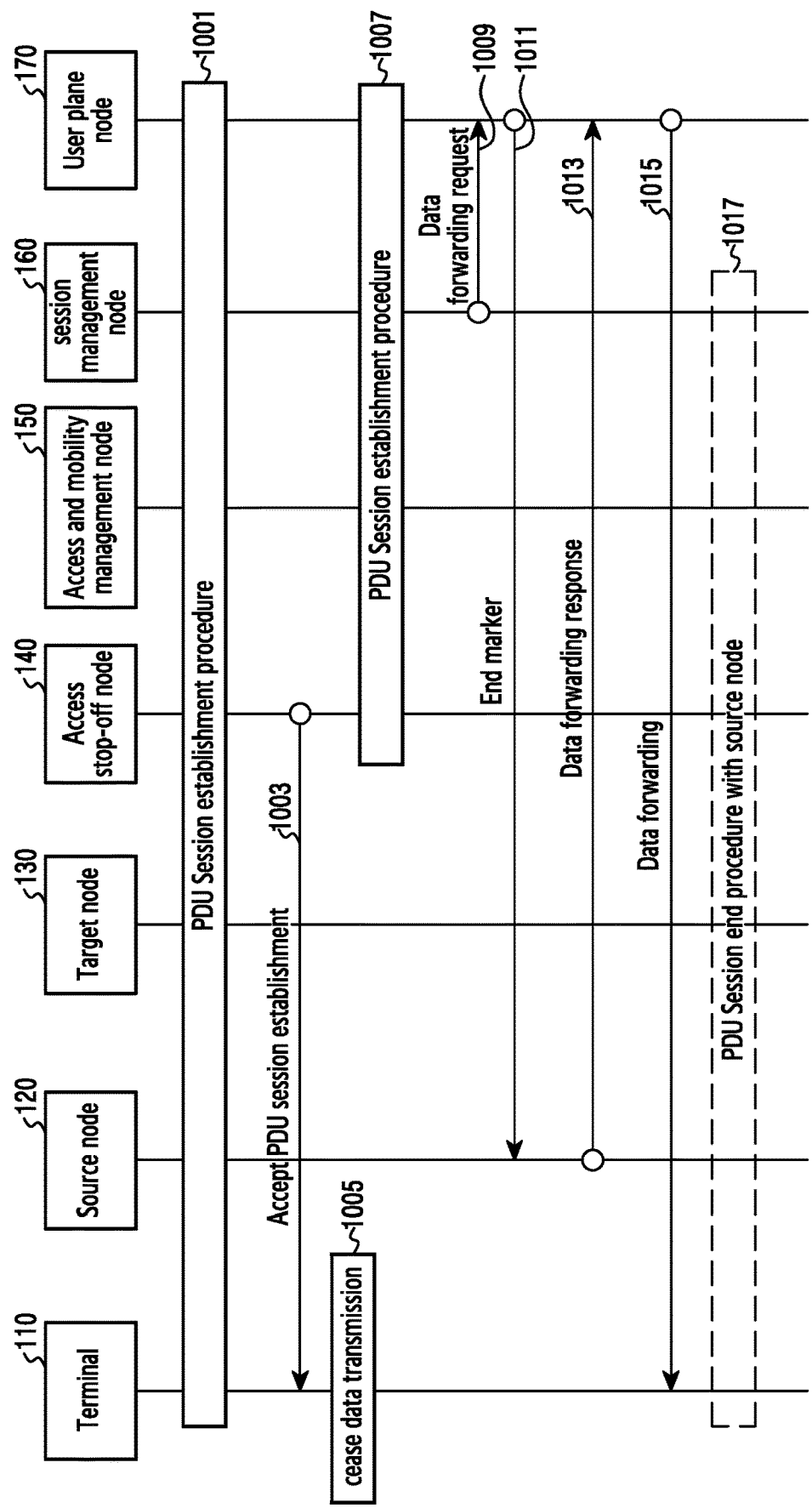
FIG. 10 is a diagram of a signal exchange for a handover completion procedure in a wireless communication system, according to an embodiment.

FIG. 10 is a diagram of a signal exchange for a handover completion procedure in a wireless communication system, according to an embodiment.

Referring to FIG. 10, in step 1001, the terminal 110 performs a procedure of PDU session establishment with the target node 130 belonging to the second network. The terminal 110 may generate a QoS flow of a PDU session with the access stop-off node 140. The QoS flow of the PDU session may include an internet protocol security (IPsec) child security association (SA).

In step 1003, the terminal 110 receives from the access and mobility management node 150 information of accepting the PDU session establishment with the target node 130 belonging to the second network. The information of accepting PDU session establishment may include an identifier of the PDU session and a QoS profile of the PDU session.

In step 1005, the terminal 110 ceases data transmission to the source node 120 belonging to the first network. The terminal 110 may start data transmission to a target node 130 belonging to the second network.

In step 1007, the access and mobility management node 150 completes the PDU session establishment through the target node 130 belonging to the second network. The access and mobility management node 150 may transmit a session management request to the session management node 160 and may receive a response relating thereto from the session management node 160. The session management request may include an interface (e.g., N2) between the access and mobility management node 150 and the session management node 160. The session management node 160 may transmit a session change request to the user plane node 170 and may receive a response relating thereto from the user plane node 170. The session change request may include information for requesting to change an interface (e.g., N4) between the session management node 160 and the user plane node 170.

In step 1009, the session management node 160 transmits a data forwarding request to the user plane node 170. The session management node 160 may instruct the user plane node 170 to start a data forwarding procedure. The data forwarding request may include an identifier for the source node 120 belonging to the first network and an identifier for a PDU session.

In step 1011, the user plane node 170 transmits an end marker to the source node 120 belonging to the first network. The end marker may include information for instructing to cease data transmission to the terminal 110.

In step 1013, the source node 120 belonging to the first network transmits a data forwarding response to the user plane node 170. The data forwarding response may include a sequence number of data which has been already transmitted from the terminal 110 to the source node 120 belonging to the first network, a sequence number of data which has been already transmitted from the source node 120 belonging to the first network to the terminal 110, and data which has yet to be transmitted to the terminal 110. The sequence number of data, which has been already transmitted from the terminal 110 to the source node 120 belonging to the first network, may include a sequence number of an uplink packet data convergence protocol (PDCP). The sequence number of data, which has been already transmitted from the source node 120 belonging to the first network to the terminal 110, may include a sequence number of a downlink PDCP.

In step 1015, the terminal 110 receives data which has yet to be received from the user plane node 170. The terminal 110 may receive the data, which the terminal 110 has yet to receive, through the access stop-off node 140. Data which has yet to be transmitted to the terminal 110 is forwarded and thus data transmission delay due to data loss may be reduced.

In step 1017, the terminal 110 ends the PDU session with the source node 120 belonging to the first network. The terminal 110 may complete the handover to the target node 130 belonging to the second network, by ending the PDU session with the source node 120 belonging to the first network.

Figure 11:
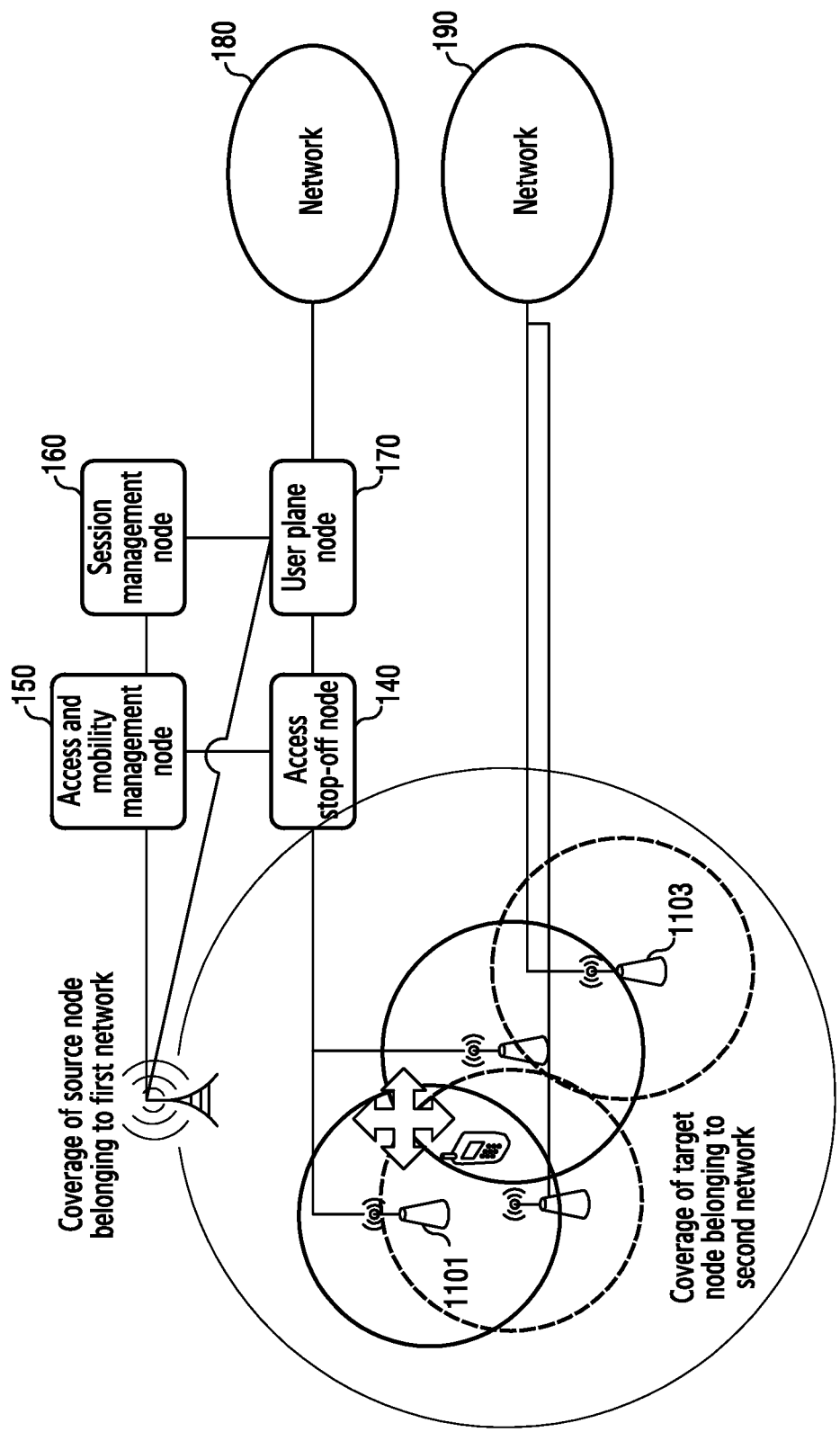
FIG. 11 is a diagram of a wireless communication system for measuring performance in a wireless communication system, according to an embodiment.

FIG. 11 is a diagram of a wireless communication system for measuring performance in a wireless communication system, according to an embodiment.

In the coverage of a single source node belonging to a first network connected to an access and mobility management node 150, multiple target nodes (e.g., target node 1101 and target node 1103) belonging to a second network may exist. A target node 1101 may be connected to the access and mobility management node 150 and a target node 1103 may not be connected to the access and mobility management node 150.

When the terminal 110 is located in an office, the access and mobility management node 150 may provide a handover policy to the terminal 110 by transmitting a handover triggering request. The handover policy may include a target node list for the second network. In this case, the target node 1101 belonging to the second network included in the target node list for the second network may be applied to a TAL for the second network assigned to the terminal 110. When the terminal 110 escapes from the TAL for the second network assigned thereto, the access and mobility management node 150 may provide a new target node list to the terminal 110, and a target node belonging to the second network included in the new target node list may be applied to the TAL for the second network assigned to the terminal 110. The access and mobility management node 150 generates a target node list by inserting into the target node list only a target node belonging to the second network connected to the access and mobility management node 150, thereby guaranteeing continuity of a data session (e.g., a PDU session) when the terminal 110 performs a handover. The terminal 110 may perform through the handover policy the handover to a target node satisfying a predetermined condition among target nodes included in the target node list for the second network.

Figure 12A:
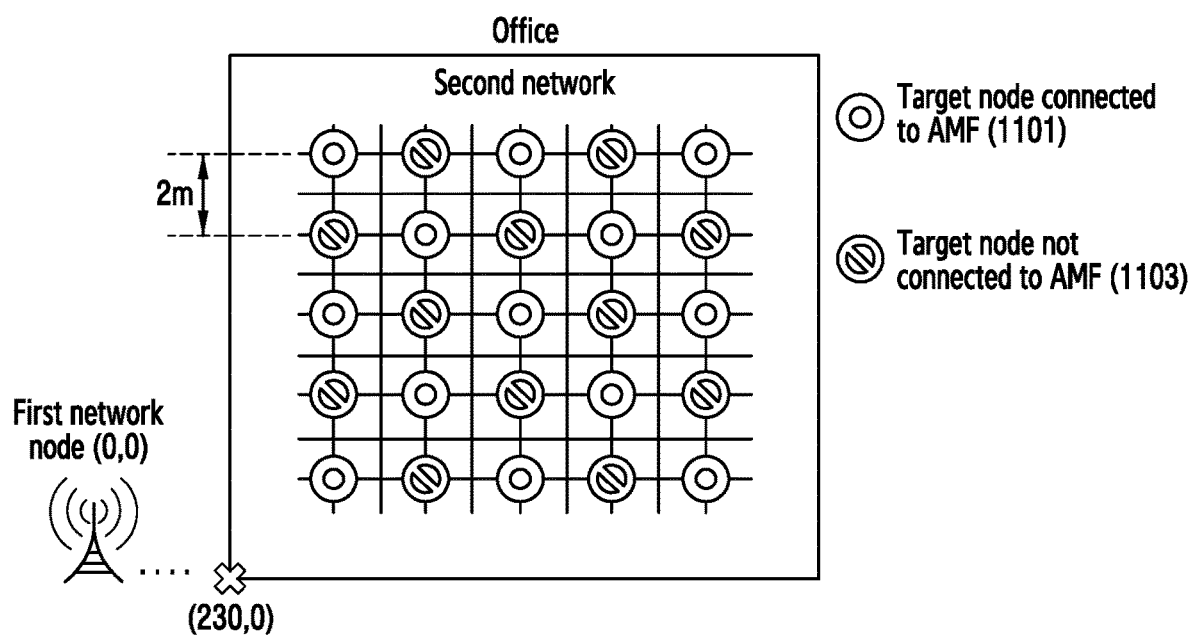
FIGS. 12A and 12B are diagrams of an arrangement of target nodes belonging to a second network in a wireless communication system, according to an embodiment.
Figure 12B:
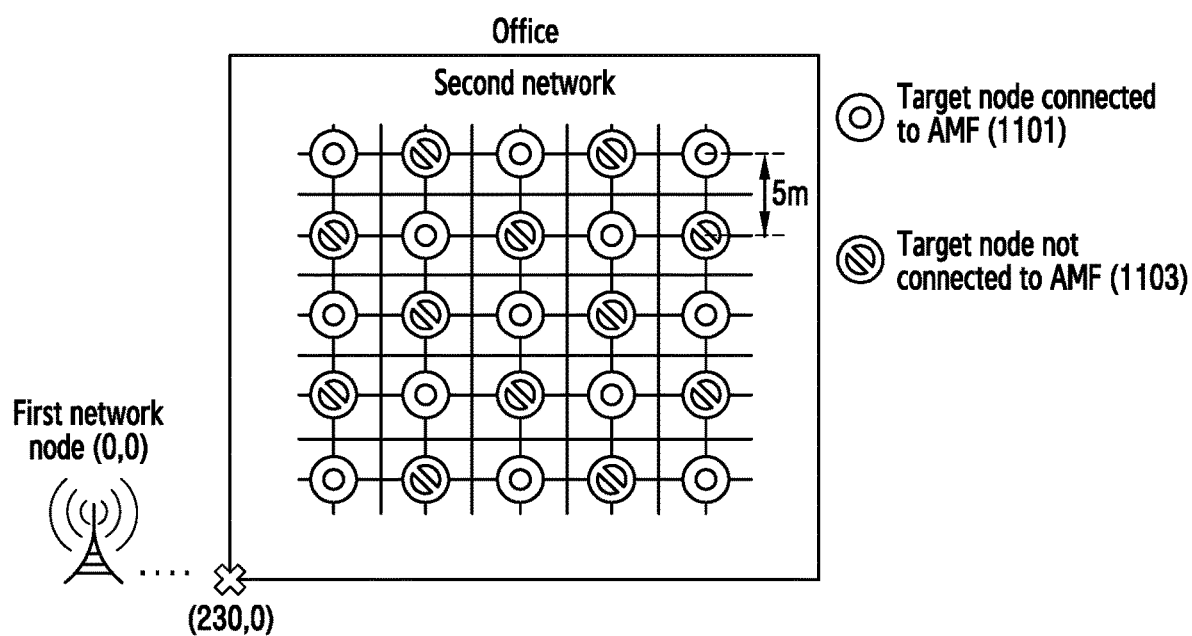

FIGS. 12A and 12B are diagrams of an arrangement of target nodes belonging to a second network in a wireless communication system, according to an embodiment. Target nodes 1101 belonging to the second network connected to the access and mobility management node 150 and target nodes 1103 belonging to the second network not connected to the access and mobility management node 150 are arranged alternately.

Referring to FIG. 12A, 25 target nodes belonging to the second network may be densely arranged in an office. The 25 target nodes belonging to the second network may be uniformly spaced at 2 m intervals. The terminal 110 may perform a handover from a source node belonging to the first network to a target node 1101 belonging to the second network.

Referring to FIG. 12B, 25 target nodes belonging to the second network may be sparsely arranged in an office. The 25 target nodes belonging to the second network may be uniformly spaced at 5 m intervals. The terminal 110 may perform a handover from a source node belonging to the first network to a target node 1101 belonging to the second network. Penetration loss of 30 dB may be applied to the target nodes belonging to the second network.

Figure 13A:
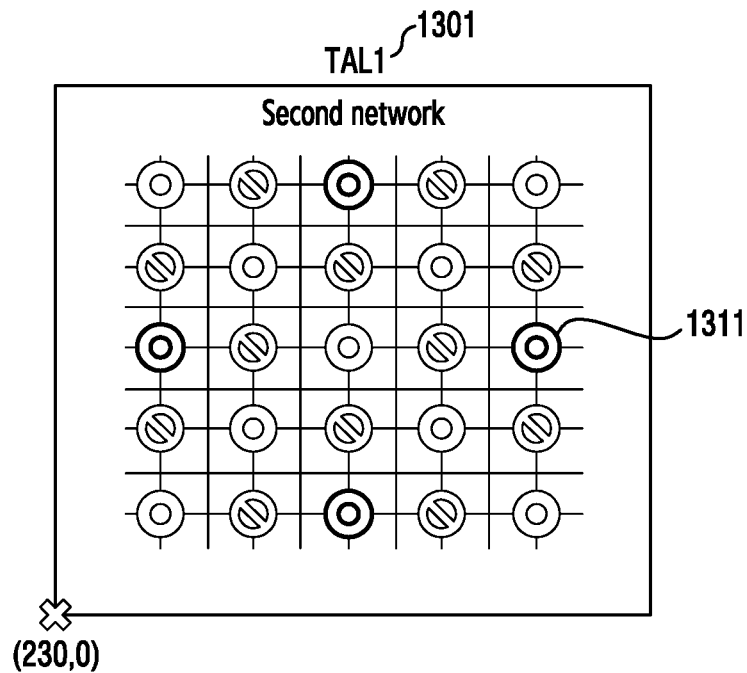
FIGS. 13A to 13C are diagrams of a tracking area list (TAL) for a second network in a wireless communication system, according to an embodiment.
Figure 13B:
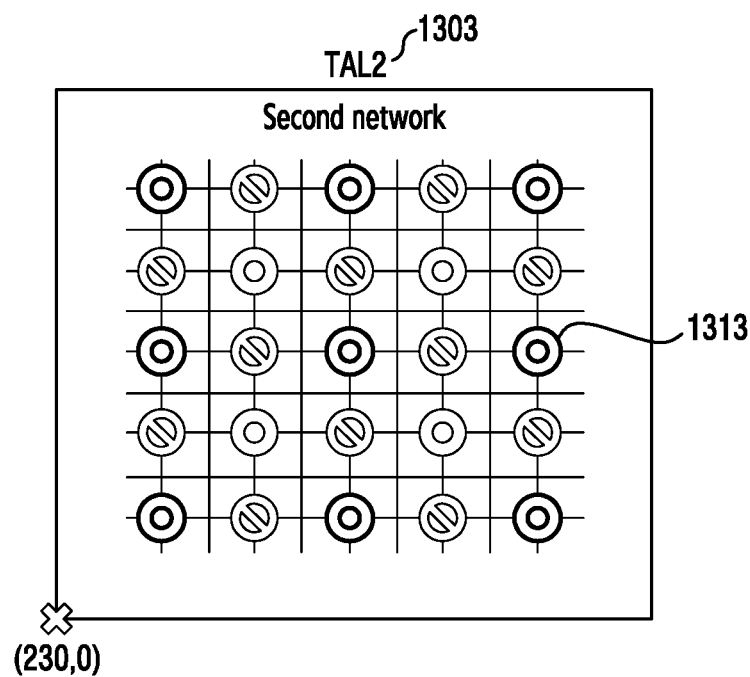
Figure 13C:
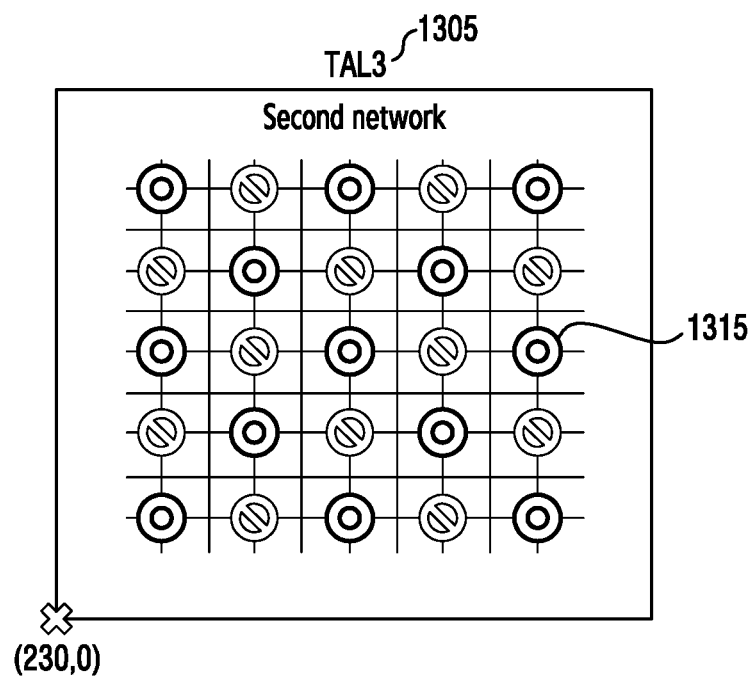

FIGS. 13A, 13B, and 13C are diagrams of a TAL for a second network in a wireless communication system, according to an embodiment.

Some of target nodes belonging to the second network connected to the access and mobility management node 150 in an office are assigned to TAL-1 1301, TAL-2 1303, and TAL-3 1305, respectively. As in FIG. 13A, four target nodes 1311 belonging to the second network may be assigned to TAL-1 1301. As in FIG. 13B, nine target nodes 1313 belonging to the second network may be assigned to TAL-2 1303. As in FIG. 13C, 13 target nodes 1315 belonging to the second network may be assigned to TAL-3 1305. When TAL-3 1305 is assigned to the terminal 110, the terminal 110 is made to perform handovers more frequently than when TAL-1 1301 is assigned thereto, yet a better Signal to Noise Ratio (SNR) may be provided. The more the target nodes belonging to the second network are included in a TAL allocated to the terminal 110, the more frequently the terminal 110 performs handovers, yet the better the SNR provided thereto may be.

Figure 14A:
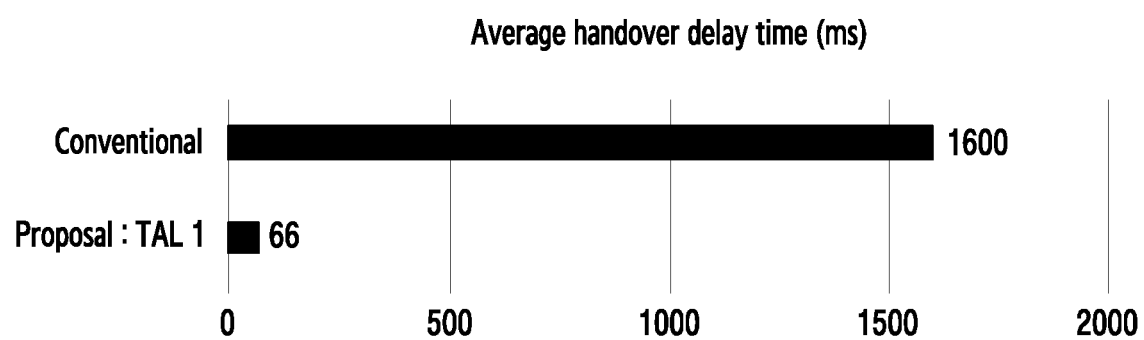
FIGS. 14A and 14B are diagrams of performance graphs relative to a conventional scheme.
Figure 14B:
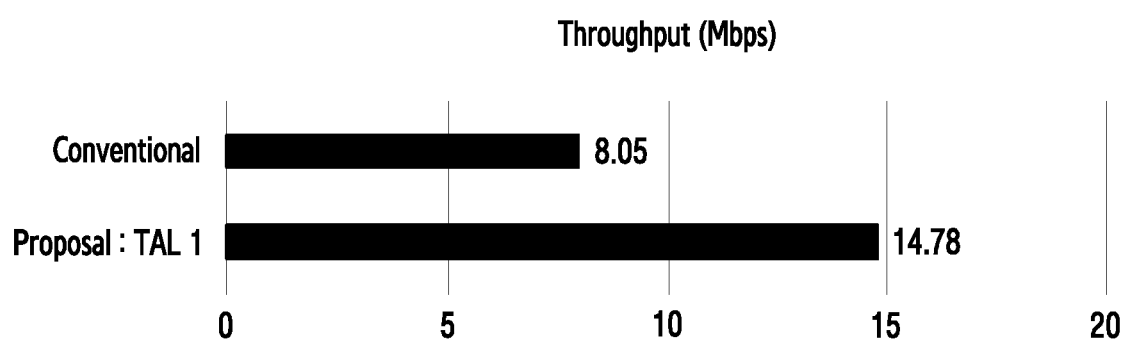

FIGS. 14A and 14B are diagrams of performance graphs relative to a conventional scheme, according to an embodiment. FIGS. 14A and 14B illustrate performance graphs relative to a conventional technique when target nodes belonging to the second network are densely arranged, and a terminal 110 to which TAL-1 1301 is assigned moves at 3 km/hour.

The conventional technique may not guarantee data session continuity since the terminal 110 performs a handover to a target node 1103 belonging to the second network not connected to the access and mobility management node 150. Therefore, in the conventional technique, a handover delay time may be increased, and throughput may be reduced. By contrast, the technique according to the disclosure may guarantee data session continuity since the terminal 110 performs a handover only to a target node 1101 belonging to the second network connected to the access and mobility management node 150. Therefore, the technique according to the disclosure may have a shorter handover delay time and greater throughput than those of the conventional technique. The conventional technique may have a handover delay time of 1600 ms, whereas the technique according to various embodiments of the present disclosure may have a handover delay time of 66 ms. The conventional technique may have throughput of 8.05 Mbps, whereas the technique according to various embodiments of the disclosure may have throughput of 14.78 Mbps.

Figure 15A:
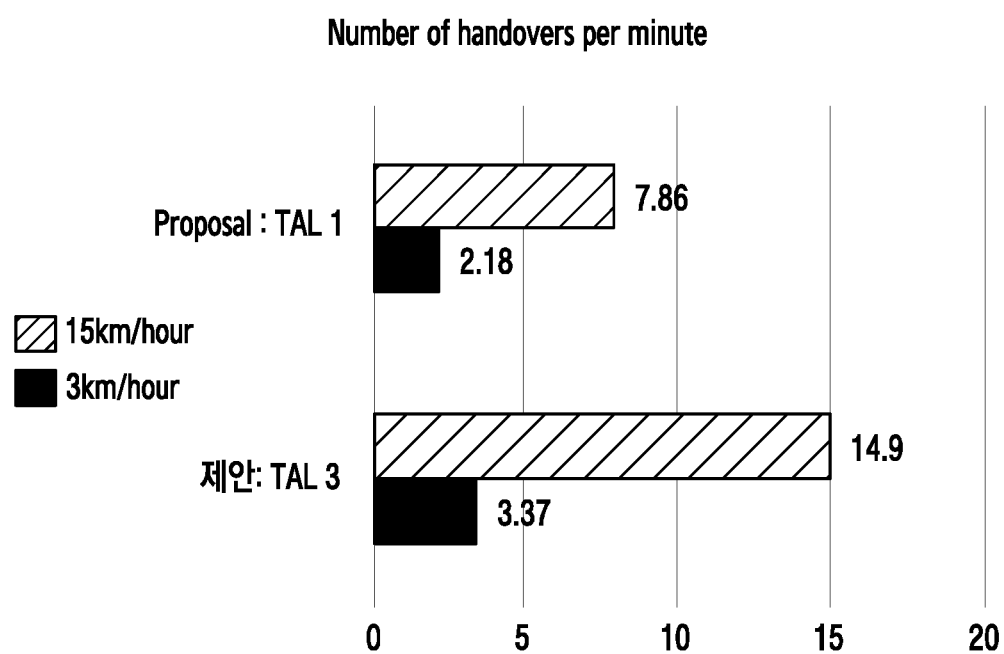
FIGS. 15A and 15B are diagrams of performance graphs according to a TAL in a wireless communication system, according to an embodiment.
Figure 15B:
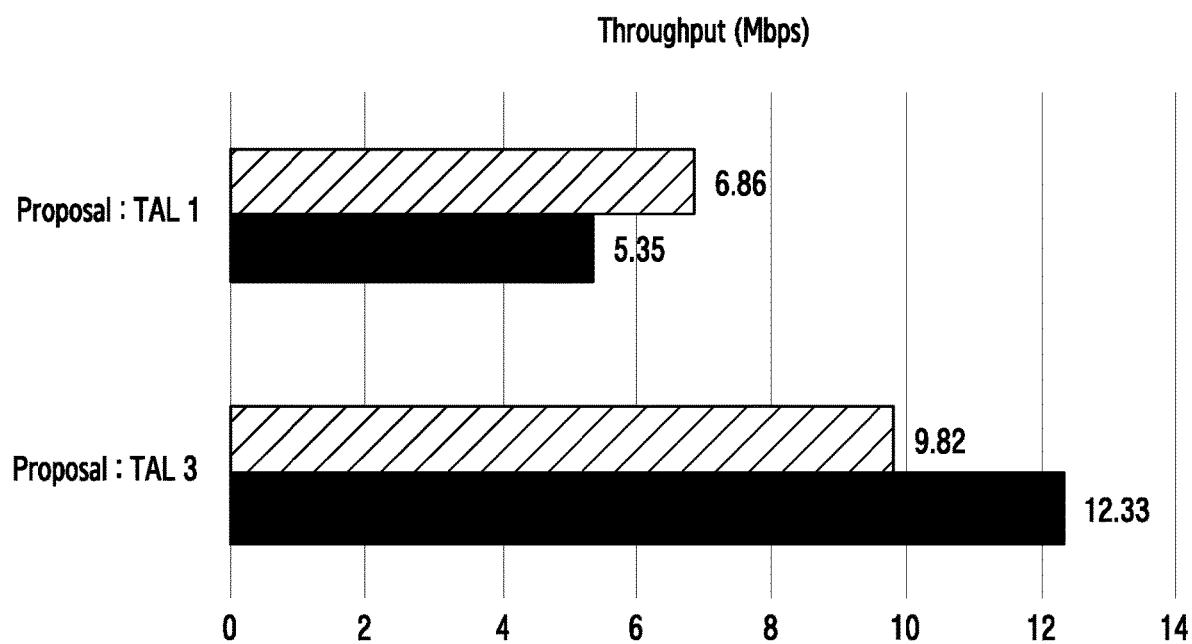

FIGS. 15A and 15B are diagrams of performance graphs according to a TAL in a wireless communication system, according to an embodiment. FIGS. 15A and 15B illustrate performance graphs where, when target nodes belonging to the second network are sparsely arranged, a terminal 110 moves at 3 km/hour or 15 km/hour and uses TAL-1 1301 or TAL-3 1305, respectively.

The number of handovers per minute performed when the terminal 110 uses TAL-3 1305 may be greater than that performed when the terminal 110 uses TAL-1 1301, regardless of the movement speeds of the terminal 110. Overhead due to handovers performed when the terminal 110 uses TAL-3 1305 may be more greatly increased than when the terminal 110 uses TAL-1 1301.

Referring to FIG. 15B, the terminal 110 may have more increased throughput when the terminal 110 uses TAL-3 1305 than when the terminal 110 uses TAL-1 1301, regardless of the movement speeds of the terminal 100. In general, the greater the overhead due to handovers is increased, the more the throughput is reduced. However, in the environment of FIGS. 15A and 15B, an SNR may more greatly influence the throughput than the overhead due to handovers. Therefore, the access and mobility management node 150 may provide an optimal target node list for the second network according to a mobility pattern of the terminal 110.

The apparatuses and methods described herein can provide a handover policy to a terminal by using a mobility pattern of the terminal and information relating to target nodes belonging to a second network around the terminal, so as to guarantee a data session QoS budget, and minimize performance degradation due to the handover.

The apparatuses and methods described herein can determine a target node belonging to a second network based on the information relating to a data session so as to allow reduction of a time that a terminal spends to search for the target node belonging to the second network and reduction of power consumption of the terminal.

The apparatuses and methods described herein can transmit information for instructing data session establishment in a wireless communication system so as to allow a procedure of data session establishment of a terminal to be triggered.

The apparatuses and methods described herein can transmit, to a terminal, a sequence number for data having yet to be transmitted, so as to enable reduction of a data transmission delay due to a data loss.

When the methods described herein are implemented by software, a non-transitory computer-readable storage medium for storing one or more programs (software modules) may be provided. The one or more programs stored in the non-transitory computer-readable storage medium may be configured for execution by one or more processors within the electronic device.

The programs (software modules or software) may be stored in non-volatile memories including a random access memory (RAM) and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for operating a terminal in a wireless communication system, the method comprising:
receiving information relating to a data session from a network node;
identifying a target node among nodes associated with a second network, based on the information relating to the data session; and
performing a handover from a source node associated with a first network to the target node associated with the second network,
wherein performing the handover from the source node associated with the first network to the target node associated with the second network comprises receiving, from the network node, information for establishing the data session.

2. The method of claim 1, wherein the first network includes a network using a licensed band, and
the second network includes a network using an unlicensed band.

3. The method of claim 1, wherein receiving the information relating to the data session comprises receiving an identifier for the data session, wireless quality relating to the data session, a target node list for the second network, and a timer for triggering of the handover.

4. The method of claim 1, wherein identifying the target node associated with the second network comprises:
identifying wireless quality relating to the data session, based on the information relating to the data session; and
identifying the target node associated with the second network, based on the wireless quality.

5. The method of claim 1, wherein performing the handover from the source node associated with the first network to the target node associated with the second network comprises: ceasing transmitting data to the source node associated with the first network,
wherein information relating to a sequence number of other data, which has been already transmitted from the terminal to the source node or has been already transmitted from the source node to the terminal, is transmitted from the source node to another network node.

6. A terminal in a wireless communication system, the terminal comprising:
at least one transceiver; and
at least one processor operably coupled to the at least one transceiver and configured to receive information relating to a data session from a network node, identify a target node associated with a second network based on the information relating to the data session, perform a handover from a source node associated with a first network to the target node associated with the second network, and receive, from the network node, information for establishing the data session.

7. The terminal of claim 6, wherein the first network includes a network using a licensed band, and
the second network includes a network using an unlicensed band.

8. The terminal of claim 6, wherein the at least one processor is further configured to receive an identifier for the data session, wireless quality relating to the data session, a target node list for the second network, and a timer for triggering of the handover.

9. The terminal of claim 6, wherein the at least one processor is further configured to identify wireless quality relating to the data session based on the information relating to the data session, and identify the target node associated with the second network based on the wireless quality.

10. The terminal of claim 6, wherein the at least one processor is further configured to cease transmitting data to the source node associated with the first network, and
information relating to a sequence number of other data, which has been already transmitted from the terminal to the source node or has been already transmitted from the source node to the terminal, is transmitted from the source node to another network node.

11. A network node in a wireless communication system, the network node comprising:
at least one transceiver; and
at least one processor operably coupled to the at least one transceiver and configured
to perform transmission of information relating to a data session to a terminal, perform a handover from a source node associated with a first network to a target node associated with a second network in response to the transmission, and transmit, to the terminal, information for establishing the data session in response to the transmission, and
the information relating to the data session is used to identify the target node associated with the second network.

12. The network node of claim 11, wherein the first network includes a network using a licensed band, and
the second network includes a network using an unlicensed band.

13. The network node of claim 11, wherein the at least one processor is further configured to: identify whether to trigger the handover of the terminal based on at least one of a mobility pattern of the terminal, information relating to at least one target node associated with the second network, information regarding the data session for performing the handover of the terminal, and a measurement value of the terminal; and
transmit the information relating to the data session to the terminal depending on the identification.

* * * * *